Figure 1:
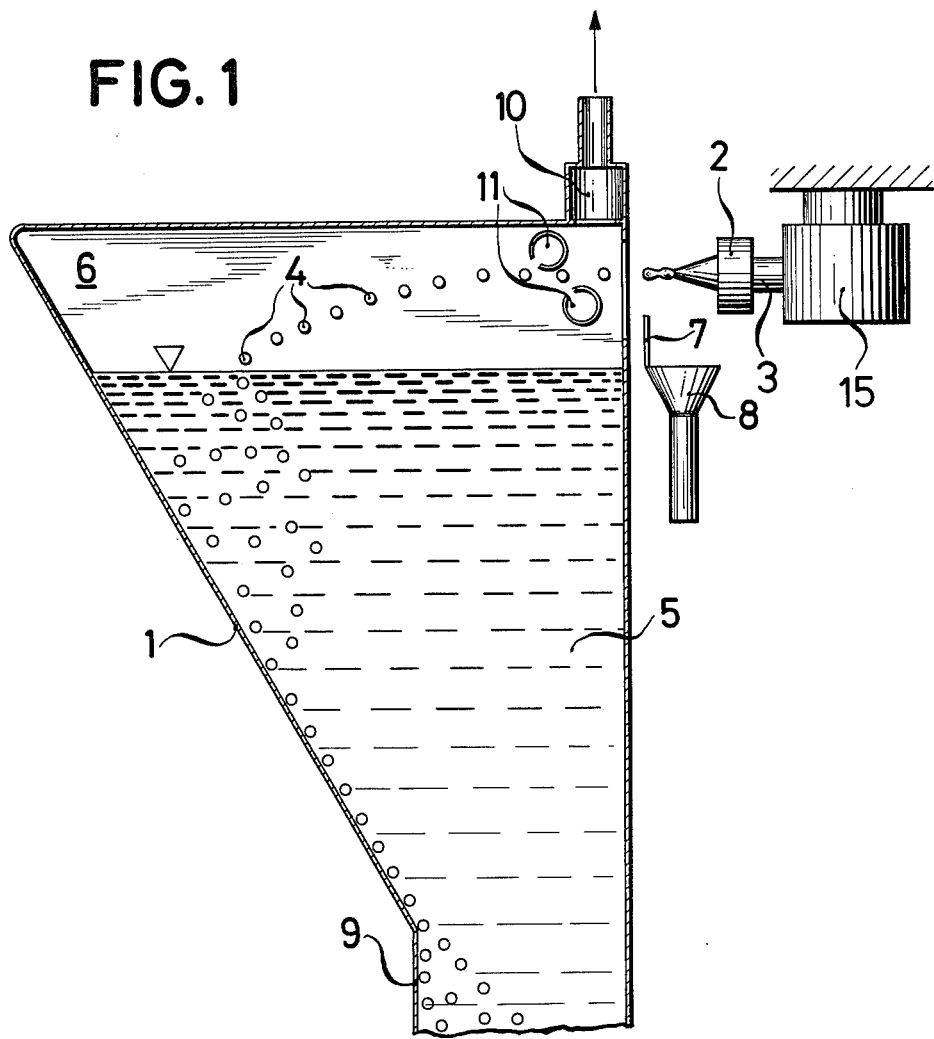

United States Patent [19]

Langen et al.

[11] 4,224,258
[45] Sep. 23, 1980

[54] METHOD AND APPARATUS FOR PRODUCING SPHERICAL PARTICLES OF UNIFORM SIZE OF NUCLEAR FUELS OR BREEDER MATERIALS

[75] Inventors: Hans Langen, Jülich; Paul Naefe, Aachen; Helmut Ringel, Niederzier-Hambach, all of Fed. Rep. of Germany

[73] Assignee: Kernforschungsanlage Jülich Gesellschaft mit beschränkter Haftung, Jülich, Fed. Rep. of Germany

[21] Appl. No.: 964,284

[22] Filed: Nov. 28, 1978

[30] Foreign Application Priority Data

Dec. 1, 1977 [DE] Fed. Rep. of Germany ....... 2753503

[51] Int. Cl.$^2$ ............................................. G21C 21/00
[52] U.S. Cl. ............................. 264/0.5; 252/301.1 S; 425/7; 422/159
[58] Field of Search .................. 252/301.1 S; 264/0.5; 425/7; 422/159

[56] References Cited

U.S. PATENT DOCUMENTS

| | | | |
|---|---|---|---|
| 3,313,602 | 4/1967 | Smith et al. | 264/0.5 |
| 3,329,745 | 7/1967 | Grange | 264/0.5 |
| 3,331,898 | 7/1967 | Haas et al. | 264/0.5 |
| 3,340,567 | 9/1967 | Flack et al. | 264/0.5 X |
| 3,586,742 | 6/1971 | Chin et al. | 264/0.5 |
| 3,617,584 | 11/1971 | Flak | 264/0.5 |

FOREIGN PATENT DOCUMENTS 2459445  7/1976 Fed. Rep. of Germany .

OTHER PUBLICATIONS

Brambilla et al., Energia Nucleare, vol. 17, No. 4, Apr. 1970 pp. 217–224.

*Primary Examiner*—Leland A. Sebastian
*Attorney, Agent, or Firm*—Flynn & Frishauf

[57] ABSTRACT

A vibrating nozzle produces a stream of drops of a nitrate solution that attain spherical drop shape before entering an ammonia gas phase where gas supply nozzles direct streams of ammonia gas obliquely against the drop stream with a component of motion in the direction of movement of the droplet stream, the incidence of the gas streams on the droplet stream being offset a few millimeters from each other along the path of the droplet stream. The flow of gas is at a speed 10 to 20 times that of the velocity of the drops of solution that are uniformly hardened on the surface in their spherical shape so that there is no deformation upon entering the aqueous solution of ammonia in the lower part of the container that confines the ammonia gas phase. The ammonia solution completes the conversion of the nitrate to the corresponding oxide, producing highly uniform spheres such are required for subsequent sintering in the production of nuclear fuel or breeder elements.

8 Claims, 2 Drawing Figures

METHOD AND APPARATUS FOR PRODUCING SPHERICAL PARTICLES OF UNIFORM SIZE OF NUCLEAR FUELS OR BREEDER MATERIALS

The invention relates to the production of uniform spherical particles of nuclear fuel or breeder materials from drops of aqueous solutions of nitrates of uranium, plutonium, or thorium, or mixtures of them, in which the solution is subdivided into drops by means of a vibrator and the drops fall into an ammonia solution for the precipitation of the corresponding oxide or oxides, after which the particles formed are dried and sintered.

The invention particularly concerns the production of such materials in which the drops of the starting solution, before falling into the ammonia solution, first pass through a space free of ammonia gas of such magnitude that the drops attain their spherical form before they pass out of that space, and then pass through a second space through which ammonia gas flows, for stabilizing the spherical shape of the drops.

The ammonia gas in such cases is introduced through one or more injection tubes and the space containing ammonia gas through which the drops pass before reaching the ammonia solution is designed to provide for sufficient hardening of the spherical drops to prevent their deformation in subsequent treatement.

The invention also concerns an apparatus for carrying out the process in question.

A process and apparatus for such a purpose is already known from German published patent application AS No. 24 59 445.

Such nuclear fuel or breeder particles are used principally for production of fuel or breeder elements for high temperature reactors. For such purposes, it is important that the particles should be produced in as uniform size as possible and that they should have a good spherical shape.

In the present state of the art, it is known to produce such nuclear fuel or breeder particles by first providing a nitrate solution and then subdividing it into drops and solidifying the drops by passing them first through a gaseous ammonia phase and, finally, introducing them into a liquid ammonia phase (solution). It occurs often that a part of this solidification process is frustrated by the addition of ammonia to the nuclear fuel or nuclear breeder solution before the separation into drops of the solution.

In order to subdivide the solution of nuclear fuel or breeder material into drops and carry out the solidification, a process has been devised known from the article "SNAM Process for the Preparation of Ceramic Nuclear Fuel Microspheres" by G. Brambilla, P. Gerontopulos, and D. Neri in laboratory studies published in "energia nucleare" in April 1970, Issue 4, Vol. 17., and, likewise from the above-named German published patent application (AS No. 24 59 445). In this process the starting solution goes vertically through a gaseous ammonia phase (the second gas-filled space through which the particles pass) and a liquid (aqueous) ammonia phase both contained in a solidifcation column at the top of which nozzles are provided by which the stream flowing out of them is divided into separate drops by vibration. In order to provide that in these drops a shell of sufficient solidity is formed so that they can be subjected to the impact on the liquid ammonia phase without permanent deformation and, of course, without shattering, the drops of fuel or breeder material solution are first allowed to pass through a gaseous ammonia phase. It has been found in this case that the spacing between the drops is so much reduced with increasing frequency of drop formation (greater than 400 Hz) that eventually insufficient ammonia gas reaches the mutually facing sides of the individual drops of such a succession of drops. There is present a $NH_3$ concentration decrease in a radial direction, so that the solidification and thereby the prehardening of the drops is produced nonuniformly in the ammonia gas phase. In consequence, upon impact of the drops on the aqueous ammonia solution, nonuniform distortion of the drops is produced.

The process known from the above-mentioned "energia nucleare" article also discloses the introduction of the ammonia gas by a laterally disposed gas supply tube. It is also known from the above-mentioned German published patent application to utilize an ammonia gas stream directed on the chain of drops with a component opposing the direction of the movement of the drops while feeding the gas from the side. This effect (i.e., flow of gas with upward component) is produced with a nozzle arranged parallel to the direction in which the drops fall, by reversing the gas flow by deflection on the surface of the ammonia solution. In spite of the utilization of these arrangements, it has, however, not been possible to prevent the occurrence of nonuniformities in the producition of spherical particles.

THE PRESENT INVENTION

It is an object of this invention to provide a method and apparatus for the production of spherical particles of nuclear fuel and breeder materials of uniform size, and in particular in a process in which nonuniformities of the particles can be prevented.

Briefly, the ammonia gas in the second part of the gas phase through which the drops pass is directed obliquely to the direction of movement of the drops and is introduced with a component of motion in the direction of the movement of the drops. In this manner, the result is obtained that as the drops, during their passage through the space containing the ammonia gas, are uniformly enveloped in the flow of ammonia gas and are, therefore, also uniformly solidified. Thus, in the desired flowing of ammonia gas past the drops, entrainment of air between the drops as they penetrate into the space containing the ammonia gas is prevented and the drops do not fall in a zone within the path of fall which is impoverished in its ammonia gas content. When a good flushing of the drops with ammonia gas is provided, the quantity of ammonia gas to be supplied in the path of fall can be better fitted to the requirements and, thereby, a saving in ammonia gas may be obtained. In consequence, the amount of waste resulting from the process is reduced.

It is particularly effective for the direction of flow of the ammonia gas to form an angle in the range from 30° to 60° with the direction of movement of the drops at the place where the gas impinges on the drops and for the speed of flow of the gas to be 10 to 20 times as great as the average velocity of the drops.

A useful modification of the process of the invention, for the case in which the ammonia gas is directed at the drops in more than one stream, is for the places of impingement of these streams to be spaced from each other.

The apparatus of the invention, accordingly comprises a first container for holding the aqueous solution of a ammonia and for confining above it a space in which ammonia gas flows, a second container for the nitrate solution provided with a nozzle for dispensing the solution in the forming of a sequence of drops and a supply tube system for supplying ammonia gas to the space above the ammonia solution with at least one nozzle for the ammonia gas so disposed with reference to the nozzle that dispenses the liquid to be converted into drops and, ultimately, into particle spheres, that the ammonia gas is directed at the drops in a stream that is oblique to the direction of motion of the drops and has a component of motion in the direction of the drops. Again, it is advantageous for the nozzle for introduction of ammonia gas to be so disposed that the ammonia gas impinges on the stream of drops so as to form an angle in the range from 30° to 60° with the drop stream. It is useful to provide more than one nozzle for introduction of ammonia gas so disposed that the places of impingement of the respective ammonia gas streams are spaced from each other. A spacing of a few millimeters is preferred.

As a further development of the invention, it is useful for the nozzles for the production of ammonia gas to be in the form of flat nozzles, which is to say that the stream is in the form of a blade or fan rather than in the form of a needle or a pencil, in which case the long dimension of the opening cross-section of the nozzle is disposed perpendicular to the plane in which the cooperating nozzles for the liquid and for the ammonia gas lie (i.e., the plane in which the axes of the gas nozzle under consideration and of the solution nozzle with which it cooperates lie).

Figure 2:
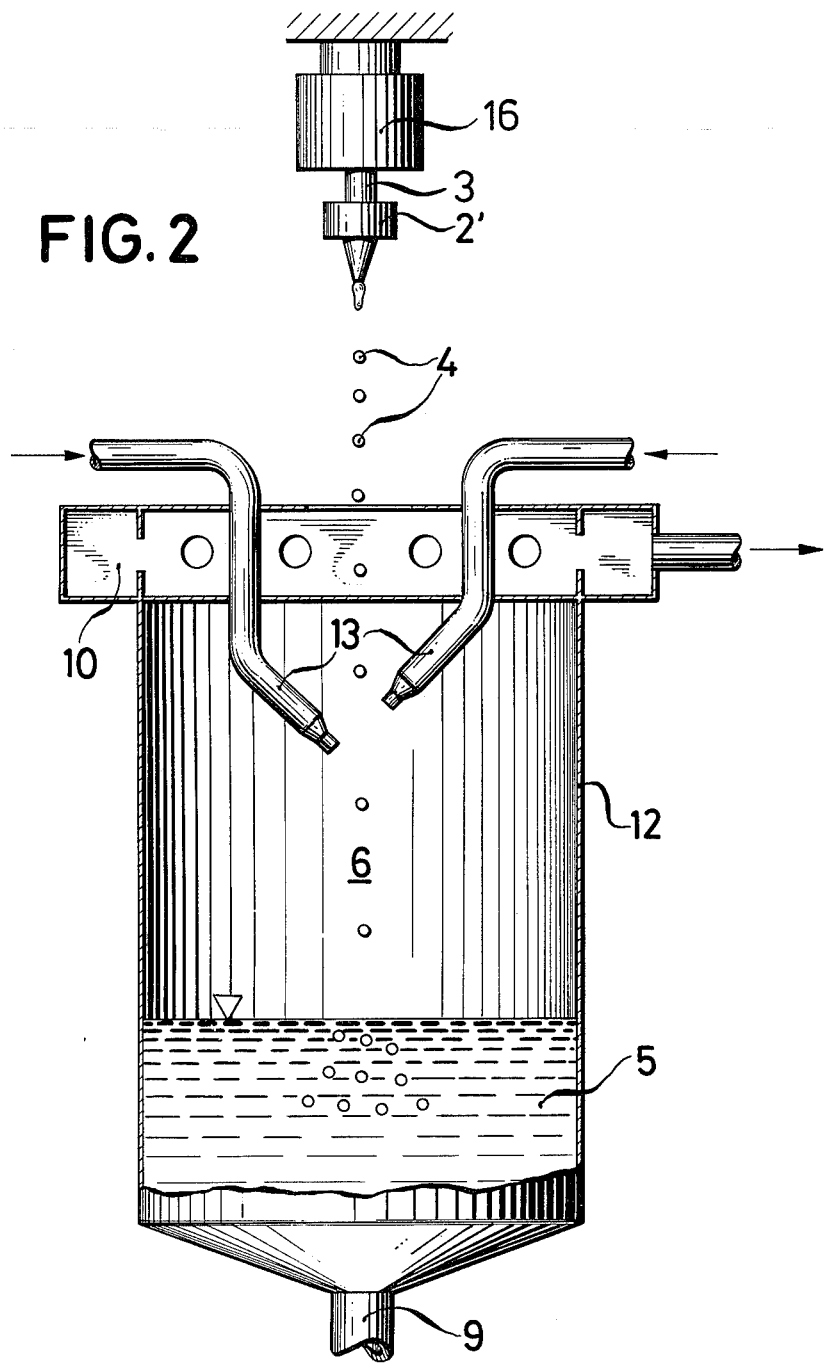

The invention is further described by way of illustrative examples with reference to the accompanying drawings in which:

FIG. 1 is a diagram, mostly in cross-section, of an apparatus according to the invention in which the drops of solution to be converted into solid particles enter horizontally into the ammonia gas phase; and FIG. 2 is a diagram, likewise mostly in vertical cross-section, of an apparatus according to the invention in which the drops of solution which are to be converted into solid particles enter into the ammonia gas phase in vertical fall.

The apparatus illustrated in FIG. 1 has a container 1, closed at the top and of funnel-shape below, which has an opening at the side near the top and opposite a horizontally directed nozzle 2 provided for projecting a stream of liquid. The nozzle 2 is connected with a vibrator 3 and with another container 15, only partly or symbolically shown in the drawing, for holding a supply of the liquid solution.

The stream of liquid 4, subdivided into drops by the action of vibrator and nozzle is directed into the ammonia gas phase 6 which is provided in the space above the surface of the aqueous ammonia solution 5 in the container 1 and is deflected by the force of gravity while passing through the ammonia gas phase.

In order to prevent that through projection or dropping, there should be formed particles that are not sufficiently uniform, either because no stationary liquid stream has yet been established or because this stream is in a state of collapse. A vertical diaphragm or baffle 7 is provided that can be shifted vertically in position between appropriate limits, so that in one of its two end positions the entrance opening for the container 1 is covered. Furthermore, the diaphragm is so connected with a funnel 8 that when the diaphragm 7 is closed, the liquid coming out of the nozzle 2 is drained by the funnel 8.

In order to prevent the gaseous ammonia phase from reaching the nozzle 2, the suction hood 10 is provided above the entrance opening of the container 1. The particles of nuclear fuel or breeder material formed by hardening in the container 1 are drawn off at the bottom through an outlet 9.

As is further shown in FIG. 1, nozzles 11, illustrated in cross-section, for introduction of ammonia gas are provided in the form of supply tubes with lateral slits so disposed with respect to the nozzle 2 that produces the liquid drop stream so that one of them is above and the other underneath the succession of drops that make up the steam 4. The slits are so directed that the ammonia impinges on the droplet stream 4 in a flow that forms an angle of about 40° with the tangent to the path of the liquid drops. By this arrangement of the nozzles 11 a passing gas flow on all sides of the drops is provided, resulting in uniform solidification of the drops even at a drop formation rate of more than 3,000 drops per minute.

The apparatus shown in FIG. 2 has a container 12 that is open on top and, again, funnel-shaped below for the aqueous solution of ammonia 5 and the ammonia phase gas 6 above it. The nozzle 2' that is connected with a vibrator 3' and a container 16 for the nitrate solution is, in this case, disposed above the container 12, and a suction system 10 to prevent upward flow of the ammonia gas is provided around the rim of the container 12. Nozzles 13 are provided for the supply of the ammonia gas to the ammonia phase 6 and, as shown in FIG. 2, are directed at an angle of about 45° to the vertical stream of drops and slightly offset vertically with respect to each other.

Although the invention has been described with respect to particular illustrative embodiments, it will be understood that modifications and variations are possible within the inventive concept; for example, a horizontal row of nozzles 2 could be arranged one behind the other in the aspect of FIG. 1, with either individual or common vibrator(s) and supply container(s) 15 to produce parallel streams of drops against which ammonia flows from elongated slits parallel to the axes of the supply pipes that with their slits provide the gas supply nozzles 11, rather than a single nozzle 2 providing a single stream 4 of droplets.

We claim:

1. A method of producing spherical particles of uniform size of a nuclear fuel or breeder material from drops of a water solution of nitrates of uranium, plutonium or thorium or mixtures of two or more of said nitrates, in which method said solution is subdivided into drops with the aid of a vibrator, and said drops are caused to fall into a water solution of ammonia after passing through a first space occupied by a gas medium free of ammonia for a sufficient distance for the formation of spherical drops and then passing through a second space containing ammonia gas for fixing the spherical shape of the drops by surface hardening, and after immersion in the ammonia solution the resulting oxide spheres are dried and sintered, comprising the improvement which consists in that:

the ammonia gas is introduced into said second space in a stream directed at the drops of said solution in a direction oblique to their direction of movement and with a component of motion in the direction movement of said drops of said solution.

2. A method as defined in claim 1 in which at the place of incidence on said drops the direction of flow of ammonia gas forms an angle with the direction of movement of said drops which lies in the range from 30° to 60°.

3. A method as defined in claim 1 in which the velocity of flow of said ammonia gas is between 10 and 20 times as great as the average velocity of movement of said drops.

4. A method as defined in any of the preceding claims in which said ammonia gas is supplied to said second space in a plurality of streams directed at said drops, and in which the places of incidence of the respective streams are spaced from each other along the path of the drops.

5. An apparatus for the production of spherical particles of uniform size of a nuclear fuel or breeder material from drops of a water solution of nitrates of uranium, plutonium or thorium or mixtures of two or more of said nitrates, comprising a first container (1) for a precipitation bath of a water solution of ammonia and an overlying volume of a gaseous ammonia phase, at least one second container (15) for said nitrate solution equipped with a nozzle for dispensing drops of said solution, and a supply conduit system for the ammonia gas, and further comprising the improvement which consists in that:

said supply conduit system for the ammonia gas comprises at least one nozzle (11,13) so disposed with respect to said nozzle (2) of said second container (15) that the ammonia gas is introduced into said volume of space (6) overlying said ammonia solution (5) in said first container (1,12) in a stream directed at the drops of said solution formed by said nozzle (2,2') of said second container (15,16) in a direction oblique to the direction of movement of said drops at the place of meeting them and with a component of motion in their said direction of movement.

6. An apparatus as defined in claim 5 in which said nozzle of said supply conduit system for the ammonia gas is so disposed that the ammonia gas stream impinges upon the succession of drops of said solution so as to form an angle in the range from 30° to 60° with the path of said drops at the place of incidence on said path.

7. An apparatus as defined in claim 5, in which supply conduit system for the ammonia gas has two nozzles (11,13) arranged one behind the other in the direction of movement of said drops which nozzles are so disposed that the places of the incidence on said drops of the respective ammonia gas streams produced by said nozzles are spaced from each other along the path of movement of said drops.

8. An apparatus as defined in claim 5, 6, or 7 in which said nozzles (11,13) of said supply conduit system for the introduction of ammonia gas are constituted as flat nozzles with the long dimension of their respective opening cross-sections disposed perpendicularly to the plane in which the axes respective nozzle for the ammonia gas of said nozzle for said solution lie.

* * * * *